(12) United States Patent
Faust

(10) Patent No.: US 8,221,297 B2
(45) Date of Patent: Jul. 17, 2012

(54) STORAGE SYSTEM FOR TOOL HOLDERS

(75) Inventor: Peter Faust, Nanaimo (CA)

(73) Assignee: Faust Solutions Ltd., Delta (CA)

( * ) Notice: Subject to any disclaimer, the term of this patent is extended or adjusted under 35 U.S.C. 154(b) by 1113 days.

(21) Appl. No.: 12/019,915

(22) Filed: Jan. 25, 2008

(65) Prior Publication Data
US 2008/0210649 A1 Sep. 4, 2008

Related U.S. Application Data

(60) Provisional application No. 60/886,717, filed on Jan. 26, 2007.

(51) Int. Cl.
*B23Q 3/157* (2006.01)
(52) U.S. Cl. ............ 483/59; 483/65; 483/5; 483/8; 483/11; 483/12; 211/70.6; 700/179
(58) Field of Classification Search .............. 483/59, 483/58, 65, 60, 61, 62, 4–11, 12; 211/70.6; 700/179
See application file for complete search history.

(56) References Cited

U.S. PATENT DOCUMENTS

| | | | | | |
|---|---|---|---|---|---|
| 2,525,208 | A | * | 10/1950 | Clink | 312/107 |
| 3,185,494 | A | * | 5/1965 | Dziedzic et al. | 483/59 |
| 3,339,273 | A | * | 9/1967 | Knosp | 483/59 |
| 3,568,849 | A | * | 3/1971 | Hutchison | 211/70.6 |
| 3,780,423 | A | * | 12/1973 | Lilienthal et al. | 483/60 |
| 4,343,077 | A | * | 8/1982 | Satoh et al. | 483/65 |
| 4,451,111 | A | * | 5/1984 | Munroe | 312/221 |
| 4,866,835 | A | * | 9/1989 | Novak | 483/63 |
| 4,943,199 | A | * | 7/1990 | Hillen | 483/61 |
| 5,169,373 | A | * | 12/1992 | Horikawa | 211/69 |
| 6,099,448 | A | * | 8/2000 | Sun | 483/31 |
| 6,228,006 | B1 | * | 5/2001 | Horn et al. | 483/58 |
| 6,464,623 | B1 | * | 10/2002 | Laur et al. | 483/58 |
| 2002/0028735 | A1 | * | 3/2002 | Hans-Dieter | 483/58 |
| 2005/0227841 | A1 | * | 10/2005 | Hwang | 483/59 |
| 2010/0323863 | A1 | * | 12/2010 | Ogasawara | 483/58 |

FOREIGN PATENT DOCUMENTS

| | | | |
|---|---|---|---|
| DE | 4116487 A1 | * | 11/1992 |
| EP | 522498 A1 | * | 1/1993 |
| JP | 62-236643 A | * | 10/1987 |
| JP | 63-057134 A | * | 3/1988 |
| JP | 11-058165 A | * | 3/1999 |
| JP | 2007-069338 A | * | 3/2007 |
| SU | 1692804 A1 | * | 11/1991 |

OTHER PUBLICATIONS

Article titled "Machine Tool Shanks & Tapers", printed from www.tools-n-gizmos.com on Mar. 12, 2012, 25 pages.*

* cited by examiner

*Primary Examiner* — Erica E Cadugan
(74) *Attorney, Agent, or Firm* — Oyen Wiggs Green & Mutala LLP

(57) ABSTRACT

A tool storage system stores tool holders for use in machine tools. The tool holders hold tools such as milling cutters, taps, drills, reamers, chamfering or deburring tools or the like. The tool holders may have standard taper-shanks. A receptacle is provided for each tool holder. The receptacles are arranged on a generally vertical array and hold the tool holders generally horizontally. The tool holders may be retained by engagement of a pull stud in the receptacle. The generally vertical array arrangement permits storing a large number of tools in a small footprint. In embodiments, a computer system provides functions for managing the tools and/or jobs in which the tools are used.

22 Claims, 10 Drawing Sheets

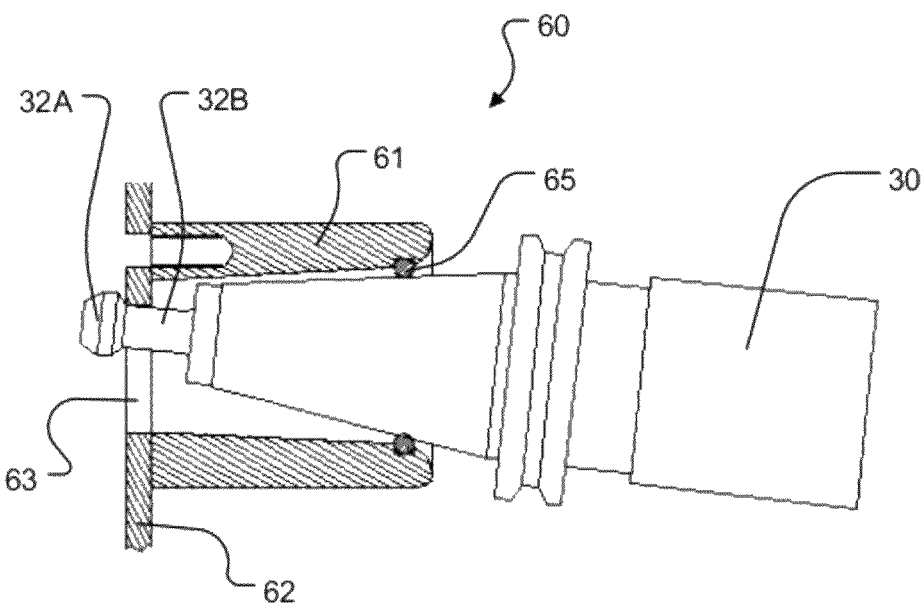
FIGURE 4A
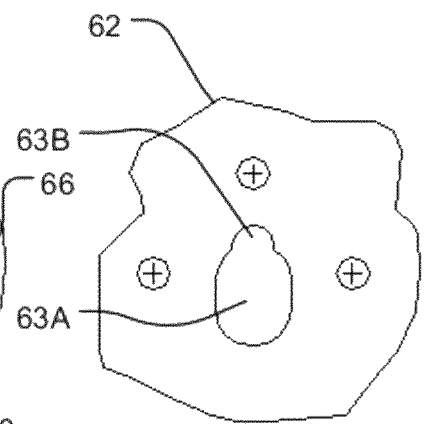 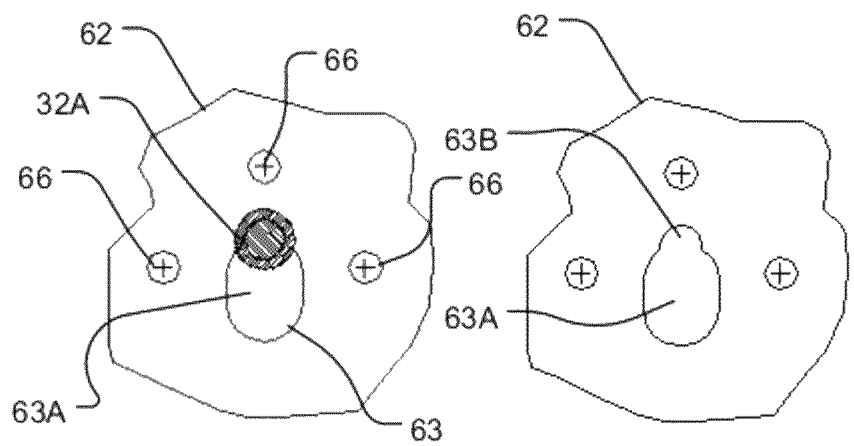
FIGURE 4B  FIGURE 4C

STORAGE SYSTEM FOR TOOL HOLDERS

CROSS-REFERENCE TO RELATED APPLICATION

This application claims the benefit of U.S. Provisional Application Ser. No. 60/886,717 filed 26 Jan. 2007 and entitled STORAGE SYSTEM FOR TOOL HOLDERS which is hereby incorporated herein by reference in its entirety.

TECHNICAL FIELD

The invention relates to CNC (Computer Numerical Control) machining and in particular to a system for storing tool holders for use in CNC machining.

BACKGROUND

A CNC milling machine can make complex parts under computer control. Such machines may use a wide range of different milling cutters and other tools. For example, different milling cutters may be used for different materials or for roughing and finishing operations, and different tools may be used for different operations such as making slots, drilling holes, deburring, contouring and the like.

A typical CNC milling machine has an automatic tool changer that can accommodate up to some maximum number of tools. Each tool is fixed in a holder that can be held by the tool changer and removably attached to the spindle of the milling machine. Ideally, all of the tools required for the current job are held in the tool changer so that the job can be completed without changing the tools in the machine.

Where a machine shop makes production quantities of a range of various parts it is common to make those parts in batches. Setting up to make a particular part involves making sure that the correct tools are in the machine's tool changer and loading a program into the machine for making the part. Where the shop makes a significant range of parts, it is not practical to keep all of the tools required for making all of the parts in the machine's tool changer because the total number of tools is often more than the capacity of the tool changer. Consequently, there is a need for a way to store tools off of the machine. Machine shops that are set up to make a wide range of different parts may have a very large number of tools and tool holders in storage at any time.

Various tool storage systems exist. For example, it is typical to provide a rack cabinet or cart having a number of flat generally-horizontal shelves. The shelves have holes in them that are dimensioned to receive tool holders. These tool storage systems have various disadvantages including the difficulty of identifying and retrieving tools that are at the back of a shelf.

A program for a CNC milling machine typically expects that the working end of a specific tool will be at a specific distance from a datum on the tool holder. A presetter may be used to set a tool to project from a tool holder by a desired distance. It is periodically necessary to remove tools from tool holders for sharpening or replacement. After a tool has been replaced in a tool holder a tool presetter may be used to measure the amount that the tool projects from the tool holder. Presetters are available from various manufacturers. It is desirable to have a presetter conveniently at hand so that a machine operator can prepare tools for a job in an efficient manner.

Different milling machines accept tool holders having different tapers. "30" taper, "40" taper and "50" taper machines exist, among others. Tool holders for CNC machines typically have retention studs (also called "pull studs" or "retention knobs") on their ends. The retention studs are used to hold the tool holders in the spindle or tool holder of the machine.

There is a need for improved tool storage systems. There is a particular need for such systems that have one or more of the following advantages: cost-effective; store a large number of tool holders and tools in a small amount of floor space; and, permit tools and tool holders to be readily identified and accessed.

BRIEF DESCRIPTION OF THE DRAWINGS

The appended drawings illustrate non-limiting embodiments of the invention.

FIGS. 4A to 4D depict a receptacle for a tool holder according to an alternative embodiment of the invention.

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

Figure 1:
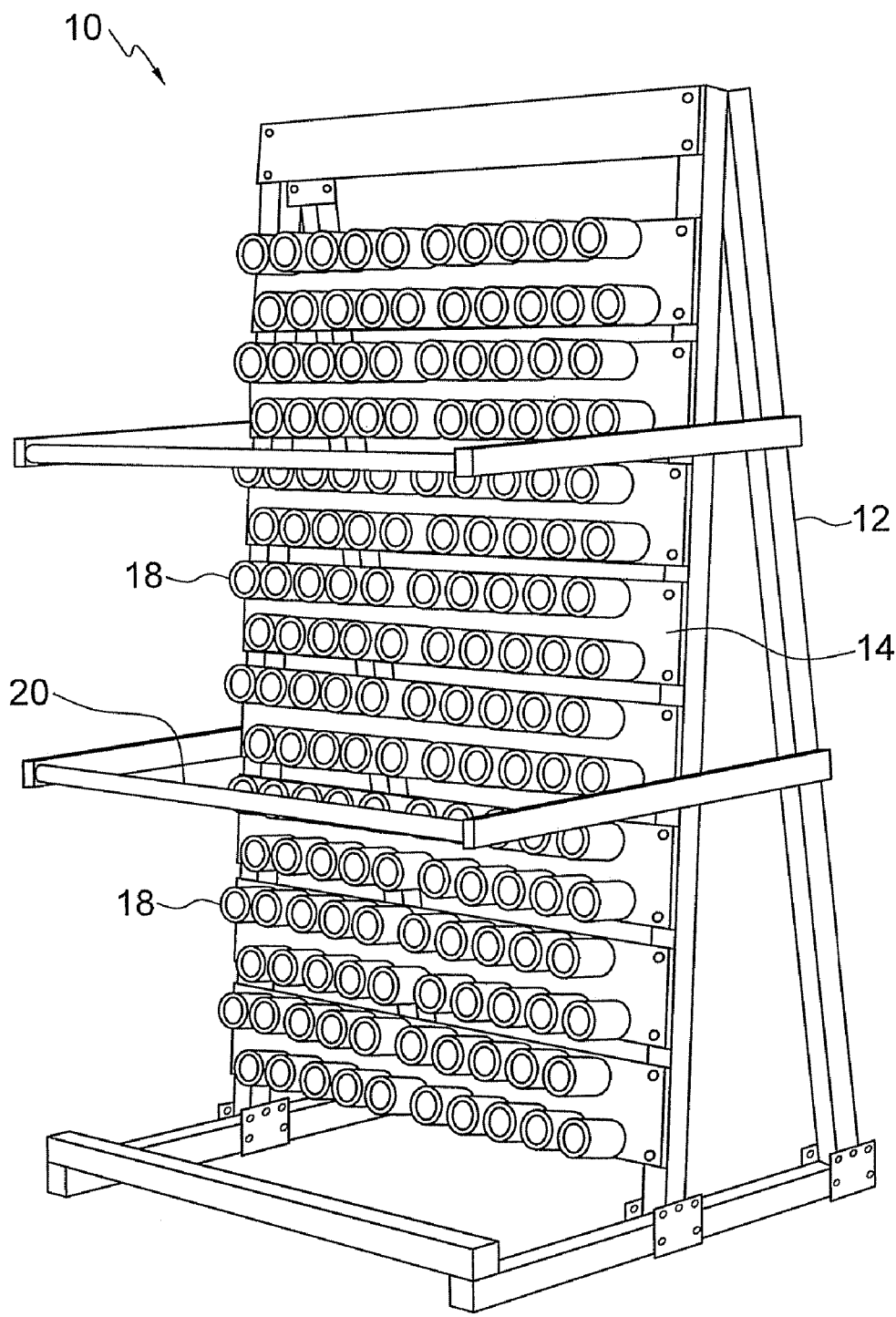
FIG. 1 depicts a perspective view of a tool storage system according to an embodiment of the invention.

FIG. 1 shows a tool storage system 10 according to one example embodiment of the invention. System 10 comprises a frame 12 which supports one or more panels 14. Each panel 14 is generally upright (e.g. within ±15 degrees or ±20 degrees of vertical). In some embodiments, panels 14 are steeply sloped but not overhanging.

Each panel supports a plurality of tool storage receptacles 18. In the embodiment of FIG. 1, each panel 14 supports 20 receptacles 18 and there are 8 panels 14 for a total of 160 receptacles 18. Each receptacle 18 can receive and hold a tool holder (not shown in FIG. 1) for a milling machine or the like (not shown). Each tool holder can hold a tool. Some non-limiting examples of tools that may be held in tool holders are: milling cutters, taps, drills, reamers, chamfering or deburring tools, face mills, inserted milling cutters, slitting saws, and the like.

Receptacles 18 are generally horizontal (e.g. within ±15 degrees or ±20 degrees of horizontal). In the illustrated embodiment, each receptacle 18 extends generally at right angles to the panel 14 that supports it although this is not mandatory. In the illustrated embodiment, an imaginary centerline of each receptacle is inclined at a few degrees to the horizontal such that the centerline rises as one moves toward the front of the receptacle and falls as one moves toward the rear of the receptacle (i.e. the receptacles are tilted upwardly).

In an example embodiment, each receptacle 18 is inclined to hold tool holders at an angle of about 6 degrees to the horizontal (i.e. an angle of about +6 degrees). In the illustrated embodiment, the receptacles are oriented to hold tool holders so that the tool holders are inclined upwardly (i.e. with the retention stud end of the tool holder lower than the tool-holding end of the tool holder).

Each receptacle can receive a tool holder. A large number of tools may be stored in tool holders in a fairly small area. Each of the tools is easily visible. System 10 has security bars 20 that prevent people from walking into exposed tools and also protect the tools from damage.

Figure 2:
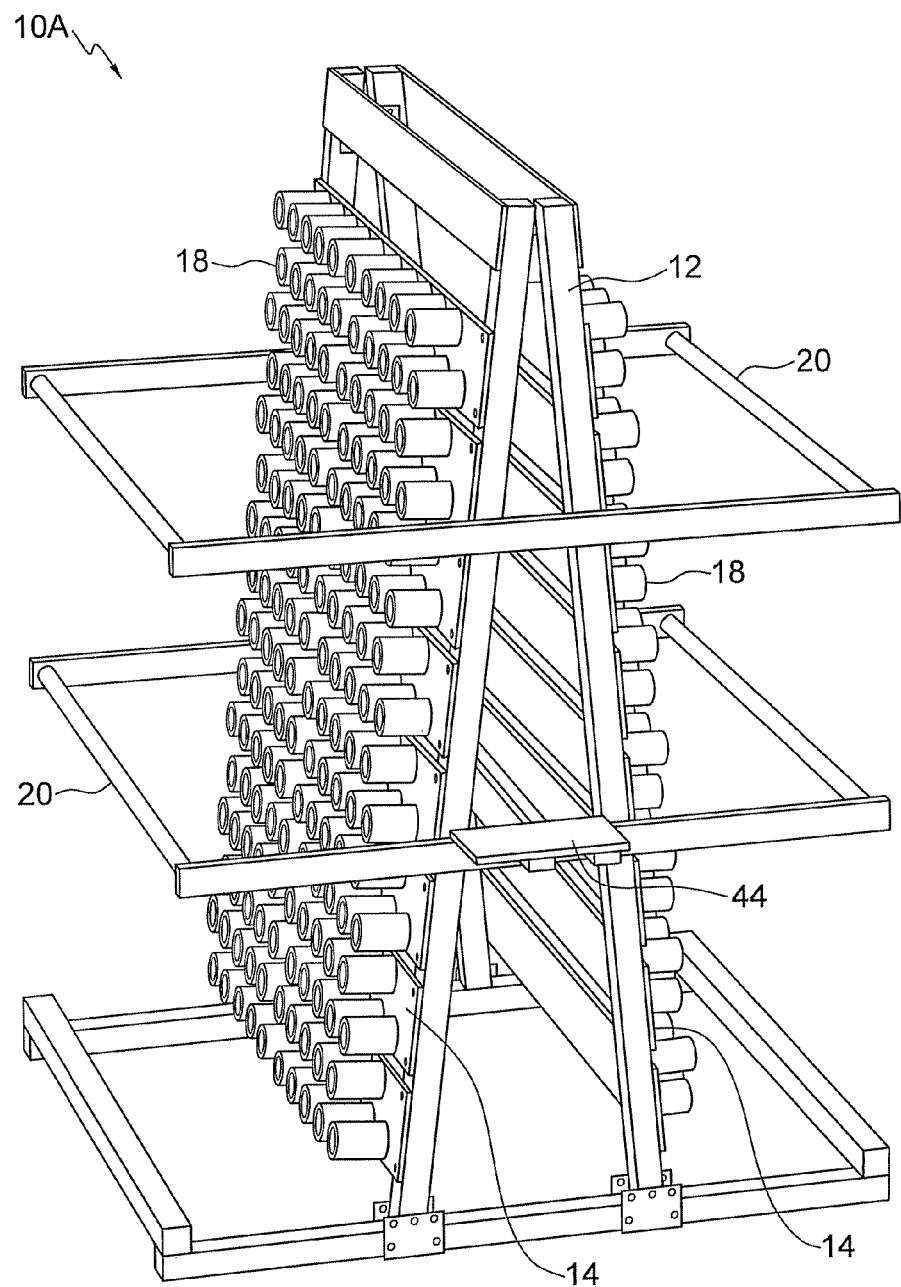
FIG. 2 depicts a perspective view of a tool storage system according to an alternative embodiment of the invention.

FIG. 2 shows a system 10A that is similar to system 10 except that it has panels 14 and receptacles 18 on two sides. System 10A can hold twice as many tools as system 10 of FIG. 1. A tool holding system may be expanded to accommodate more tools by adding panels 14 carrying additional receptacles 18.

Figure 3A:
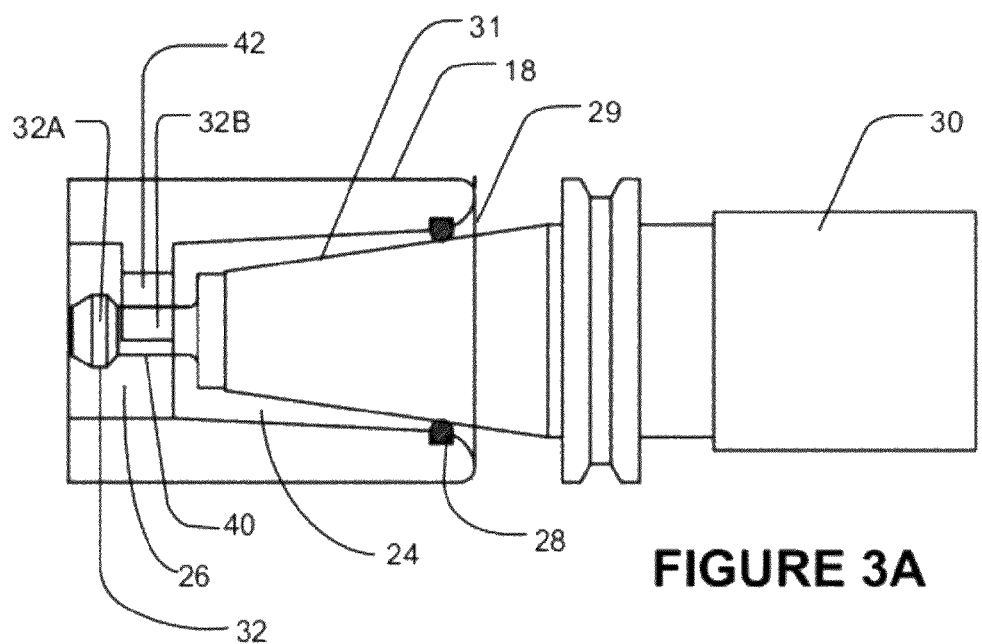
FIGS. 3A to 3C depict a receptacle for a tool holder according to an embodiment of the invention.
Figure 3B:
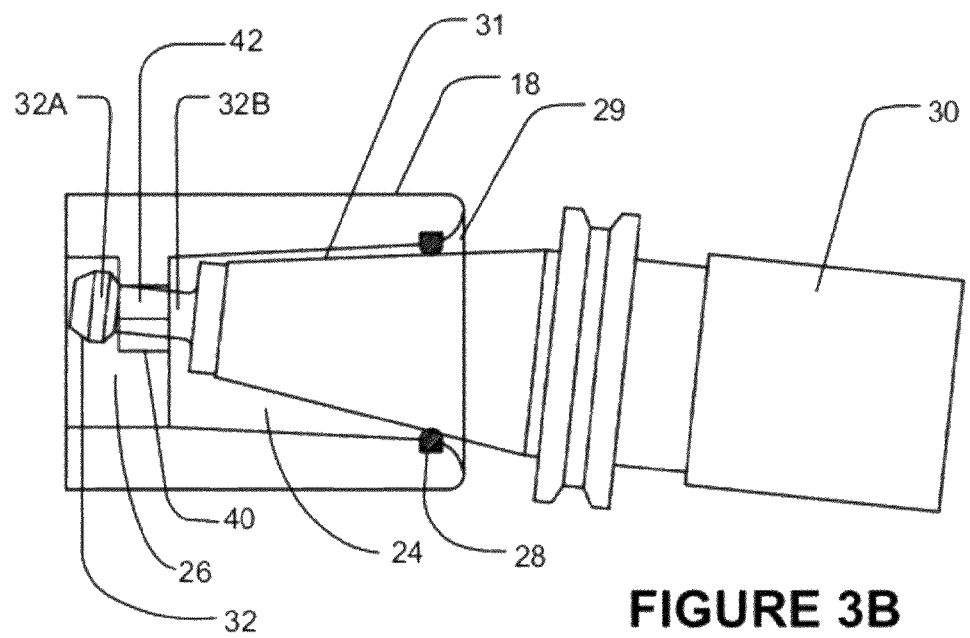
Figure 3C:
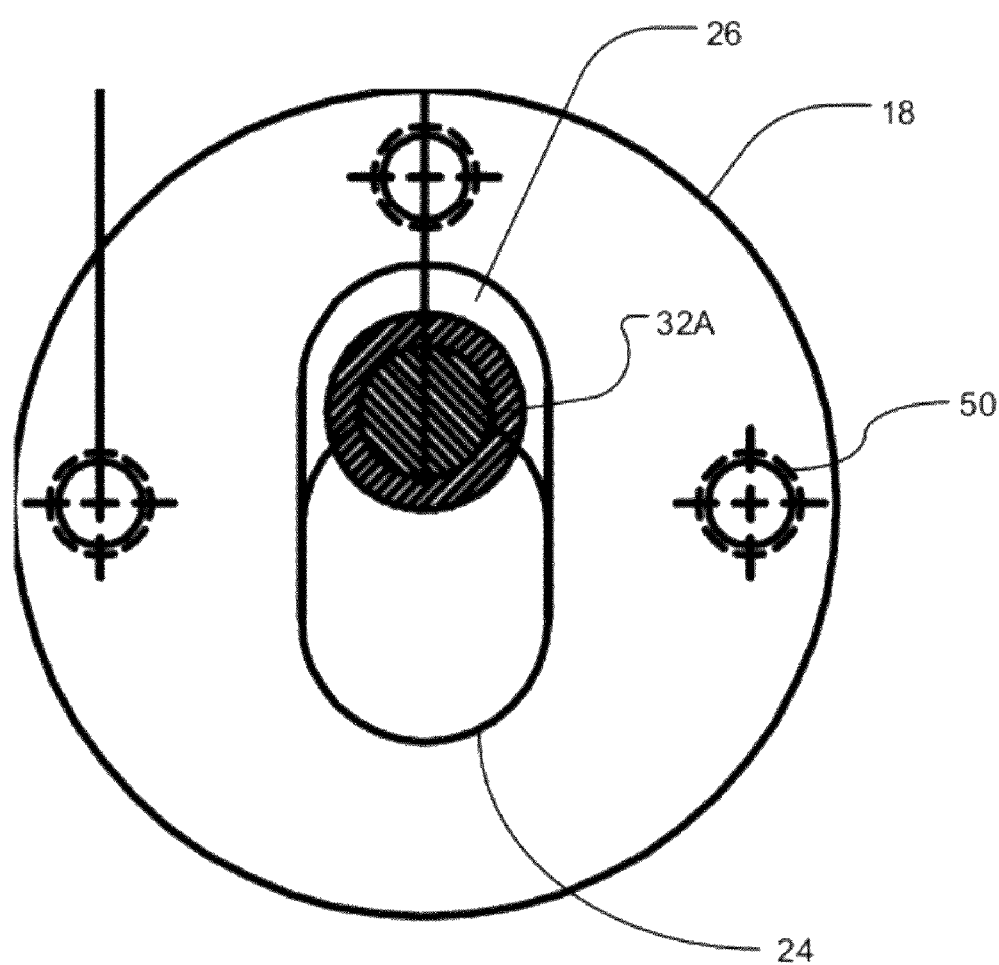

FIGS. 3A to 3C show details of one embodiment of an example receptacle 18. Receptacle 18 may be made of plastic or any other suitable material. Suitable grades of plastic have the desirable property that they are softer than the material of tool holders and so will not scratch or damage tool holders that are being inserted into them.

As shown in FIG. 3A, receptacle 18 includes a forward-facing socket portion 24 that receives the tapered part 31 of a tool holder 30 and a retention portion 26 that receives and holds the retention stud 32 of tool holder 30. In the illustrated the embodiment, a resilient band 28, such as an O-ring, encircles socket portion 24 near its outer opening 29. Resilient band 28 provides a gentle non-damaging point of contact with the taper portion of tool holder 30.

Retention portion 26 has an opening 40 that is large enough to pass the head 32A of retention stud 32 below a slot 42 that is too small to pass head 32A of retention stud 32 but is large enough to receive the neck 32B of retention stud 32. Thus, a tool holder 30 may be securely engaged with receptacle 18 by pushing tool holder 30 into socket portion 24 until head 32A of retention stud 32 projects through opening 40 and then allowing tool holder 30 to pivot downwardly until neck 32B is received in slot 42, as shown in FIG. 3B.

In this engaged embodiment, resilient band 28 supports the tapered part 31 of tool holder 30 from below and retention stud 32 is urged upwardly into slot 42 because the center of gravity of tool holder 30 (together with any tool being held in tool holder 30) is outside of resilient band 28. In this embodiment, resilient band 28 acts as a fulcrum. In the illustrated embodiment, when tool holder 30 is engaged in receptacle 18 the centerline of tool holder 30 is not aligned with the centerline of socket portion 24. It is not necessary for socket portion 24 to have a shape that fits (i.e. that has the same taper as) tapered part 31.

Receptacles 18 may be dimensioned to accept tool holders of various different configurations and sizes. One example of a tool holder is a CAT 40 tool holder. For further example, in some embodiments, receptacles 18 are dimensioned to receive and retain 30-, 40-, 45-, 50- or 60- taper V-flange tool shanks.

The system 10A shown in FIG. 2 includes a shelf 44 to which a tool presetter may be mounted.

As shown in FIG. 3C, threaded holes 50 in receptacle 18 facilitate attachment of receptacle 18 to a panel 14 or other substrate.

It can be appreciated that the illustrated embodiments have the advantages of:
being robust,
being able to accommodate a large number of tool holders in a small floor space,
being simple (there are no motors or other moving parts), and
making it easy to see and access all of the tools being stored.

Figure 4D:
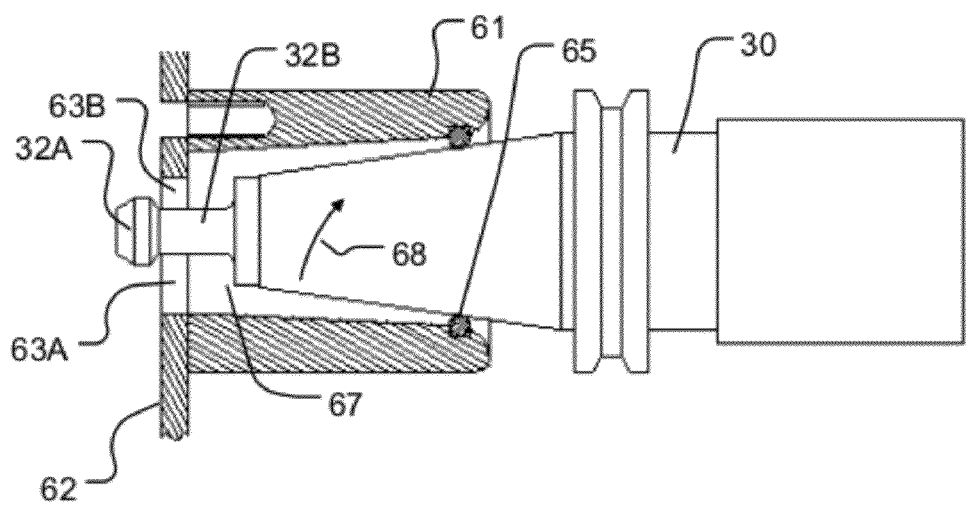

FIGS. 4A to 4D illustrate a receptacle 60 comprising a body 61 mounted to a plate 62. In FIGS. 4A and 4B a tool holder 30 is being held in receptacle 30 by the engagement between the head 32A of a retention stud and plate 62. In this embodiment, the retention stud 32 of a tool holder being held in receptacle 60 projects through an aperture 63 in plate 62. FIG. 4B is a view of the rear side of plate 62 and shows the head 32A of a retention stud that extends through aperture 32A.

In the illustrated embodiment, aperture 63 is keyhole-shaped and has a larger-diameter portion 63A through which head 32A of retention stud 32 can pass and a smaller-diameter portion 63B which is too narrow to allow passage of head 32A but is wide enough to accept neck 32B. This can be seen in FIG. 4C in which a retention stud is not shown.

Body 61 may be provided in various sizes. For example, different bodies 61 may be provided to accommodate 30-, 40-, 45-, 50- or 60-taper tool holders. In the illustrated embodiment, body 61 has a resilient band 65, such as an O-ring, in its bore. Band 65 protects the taper of a tool holder retained in receptacle 60.

A range of different styles and sizes of retention studs are used by different machine tool manufacturers. Different plates 62 may be provided to receive different designs of retention studs. The design of receptacle 60 provides flexibility. A receptacle 60 for receiving a particular taper of tool holder equipped with a particular size and style of retention stud can be provided by attaching a body 61 appropriate for the tool holder taper to a plate 62 which is configured to receive and hold the retention stud.

A tool holder 30 may be inserted into a receptacle 60 for storage by pushing the end of the tool holder 30 into the bore 67 of body 61 until the head 32A of retention stud 32 has passed through aperture 63 as shown in FIG. 4D and then allowing the tool holder to pivot about the fulcrum provided by resilient band 65 as indicated by arrow 68 until the neck 32B of retention stud 32 enters narrow portion 63B of aperture 63. The tool holder may be removed from the receptacle by lifting the exposed end of the tool holder upwardly to disengage retention stud 32 from narrow portion 63B and then pulling the tool holder out of the receptacle.

Figure 4E:
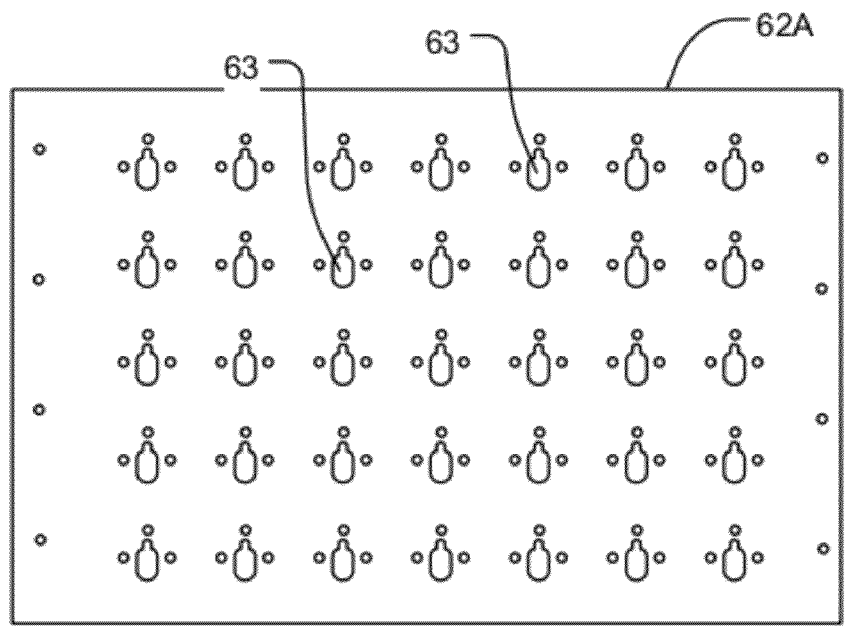
FIGS. 4E and 4F are plates configured to support a plurality of tool holders.
Figure 4F:
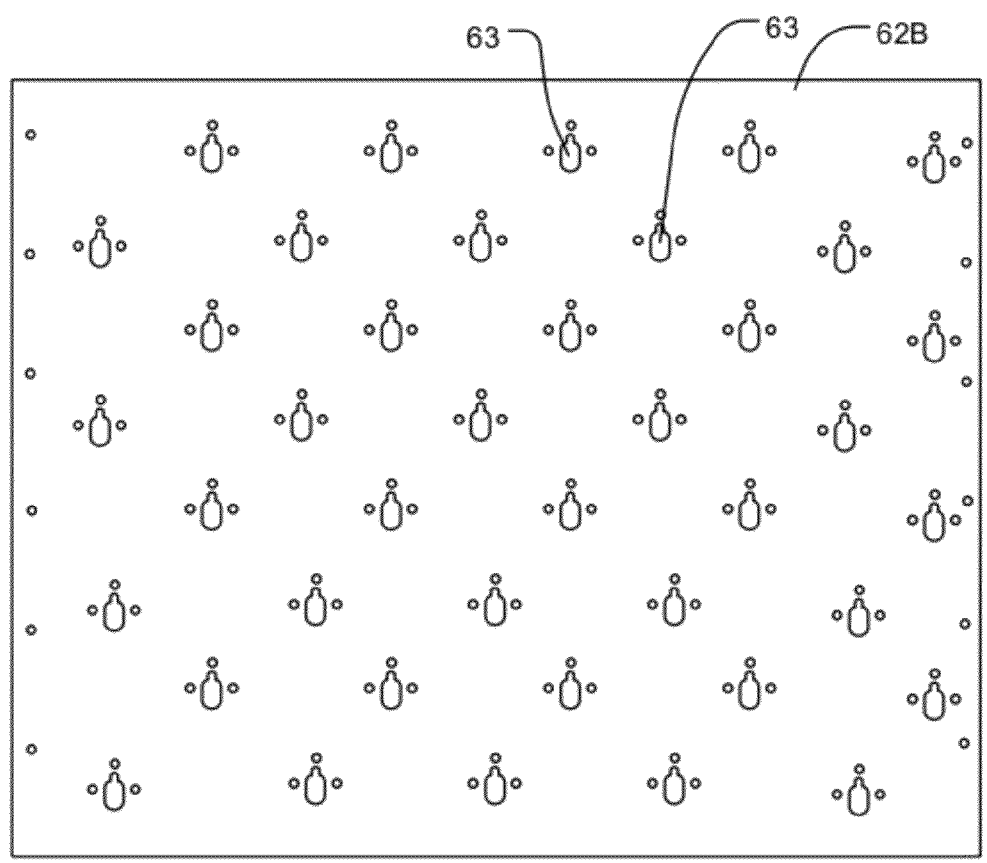

In some embodiments, plate 62 is common to a plurality of receptacles 60. In some embodiments, plate 62 comprises an array of apertures 63 for receiving retention studs 32. In such embodiments, a user may attach bodies 61 to plate 62 adjacent to some or all of the array of apertures 63. FIGS. 4E and 4F show plates 62A and 62B respectively, each plate bearing an array of apertures 63. A tool storage system may be assembled by affixing one or more plates like plate 62A or 62B equipped with bodies 61 to a suitable support such as wall studs, a free-standing frame, or the like. In plate 62B apertures 63 are arranged to facilitate placement of receptacles so that rows of receptacles can be provided in pairs with a top row of receptacles staggered relative to a bottom row of receptacles.

In the illustrated embodiment bodies 61 are attached to plate 62 by means of bolts or screws 66 that pass through apertures in plate 62 into threaded engagement with bodies 61. In alternative embodiments, bodies 61 are affixed to plate 62 by other affixation means such as:
suitable adhesive such as durable high-strength epoxy;
rivets;
press-fit pins;

tabs projecting from plate 62 that engage corresponding grooves, slots or the like in body 61;

tabs projecting from body 61 that engage corresponding grooves, slots or the like in plate 62;

and the like.

Any suitable means may be provided to attach bodies 61 to plate 62.

In some embodiments, a plurality of receptacles 60 are arranged to provide a tool storage system wherein receptacles 60 in different regions of the tool storage system have plates 62 adapted to receive and secure different styles and/or sizes of retention studs. Thus, tool holders for one machine tool or group of machine tools may be stored in one region of the tool storage system while tool holders for other machine tools are stored in other regions of the tool storage system. In some embodiments, bodies 61 or plates 62 or receptacles 18 are color coded to identify the different regions of the tool storage system.

Figure 5:
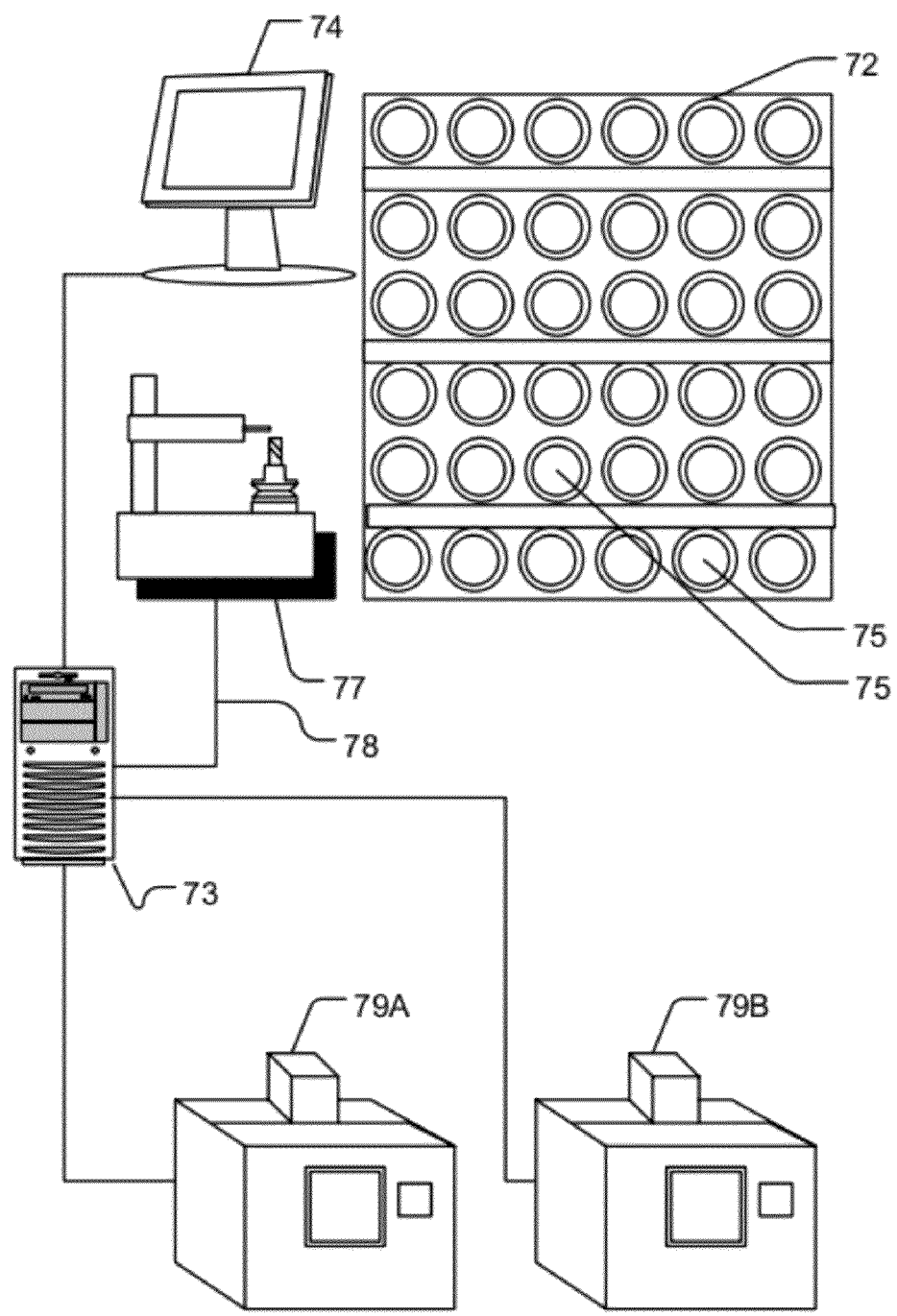
FIG. 5 illustrates a system comprising a computer and a tool storage system.

FIG. 5 illustrates a tool management system 70 comprising a tool storage system 72 combined with a computer 73 comprising a display 74. Tool storage system 72 provides at least one group of receptacles 75 for tool holders arranged in a generally-upright array. Tool storage system 72 may, for example, comprise a system of receptacles of a type described herein. In the illustrated embodiment, display 74 is mounted to the tool storage system so that it is easily accessible to a user of tool storage system 72. In the illustrated embodiment, display 74 is located so that a user can see display 74 and tools stored in tool storage system 72 at the same time.

Computer 73 contains information relating to tools associated with receptacles 75. This information can be made readily available to machinists on the shop floor by way of display 74. For example, without limitation, computer 73 may contain information such as:

The type of tool in a tool holder to be stored in a particular receptacle (e.g. for a milling cutter, the information could include one or more of: number of flutes, diameter, length, tapered or not, degree of taper, end geometry, type of coating, etc.)

Tool supplier information (e.g. name of supplier, supplier's address, contact information for supplier, part number, etc.)

Tool manufacturer information (e.g. name of manufacturer, manufacturer's part number, etc.)

Consumables associated with the tool, (e.g. where the tool uses inserts, the type(s) and size(s) of the inserts, number of inserts required, supplier information for the inserts, manufacturer information for the inserts, part number(s) for the inserts, nature of any coating on the inserts, etc.)

Stock and order information for the tool and any consumables (e.g. how many are in stock, when were any pending orders placed, order numbers, expected delivery date, information about back-orders, etc.)

Operating parameters for the tool (e.g. appropriate speeds and feeds, coolant requirements, etc.)

Prior use information for the tool currently in the tool holder (e.g. total cutting time, number of cycles, when last sharpened, etc.)

Offset information (e.g. how far does the tool currently in the tool holder project from a reference datum of the tool holder)

Location information (e.g. if the tool/tool holder is not in its receptacle on tool storage system 72 where is it? Example locations are a particular machine or a particular tool pocket in a particular machine, out for repair, etc.)

Notes (e.g. machinists' notes regarding the tool or its use).

Figure 6:
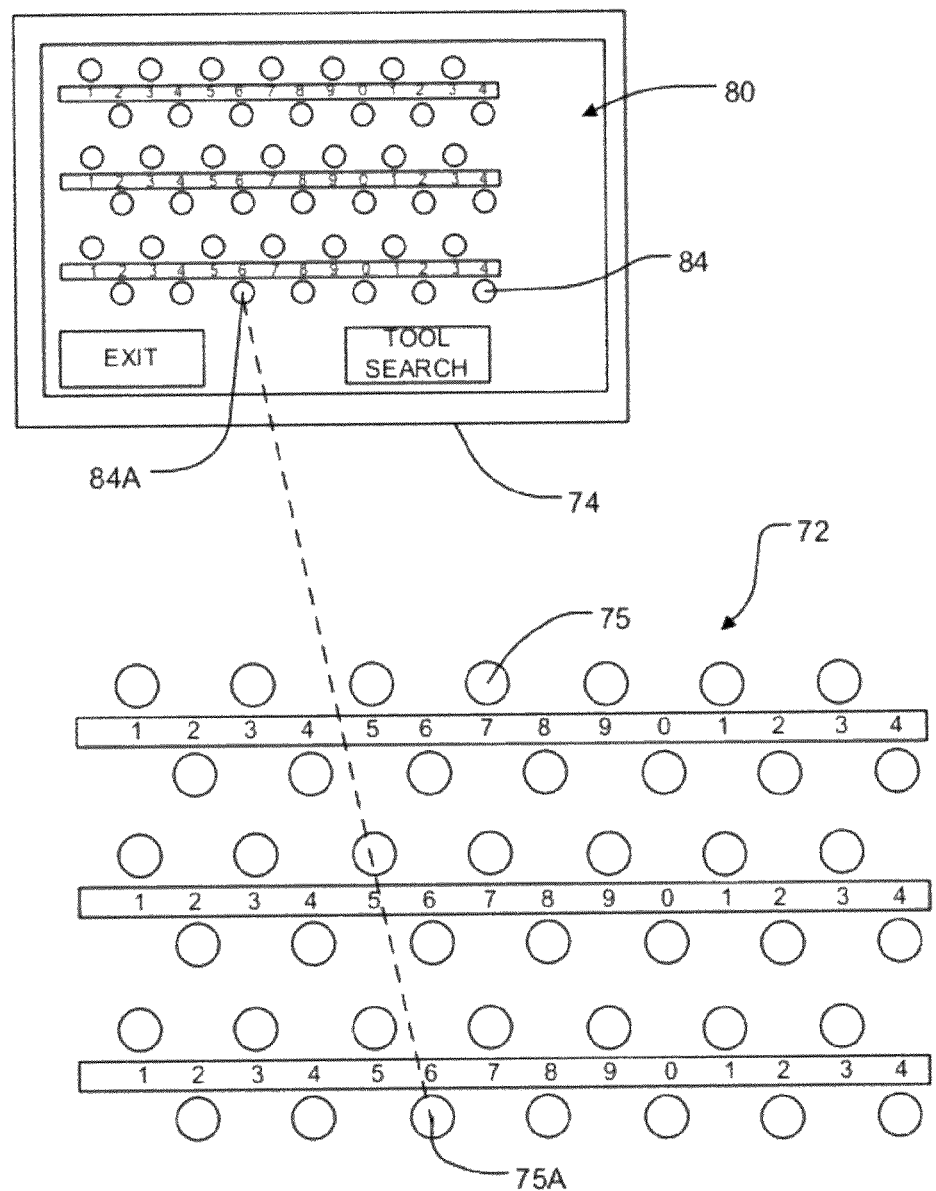
FIG. 6 illustrates a graphical user interface useful for accessing information regarding tool/tool holder combinations.

In an embodiment, computer 73 presents a graphical user interface (GUI) 80 of a particular kind as illustrated in FIG. 6, for example. GUI 80 presents a graphic depiction of the array of tool holder receptacles provided by tool storage system 72 on display 74. In the embodiment shown in FIG. 6, a control 84 is provided on display 74 for each receptacle 75 in a tool storage system 72. For example, control 84A corresponds to receptacle 75A. Further, controls 84 are arranged on display 74 in a geometric arrangement that is substantially the same as the way that the corresponding receptacles 75 are arranged on tool storage system 72. This allows a machine operator to intuitively and quickly identify a control 84 corresponding to any particular receptacle 75 on display 74 or to identify the receptacle 75 on tool storage system 72 corresponding to any particular control 84.

Figure 7:
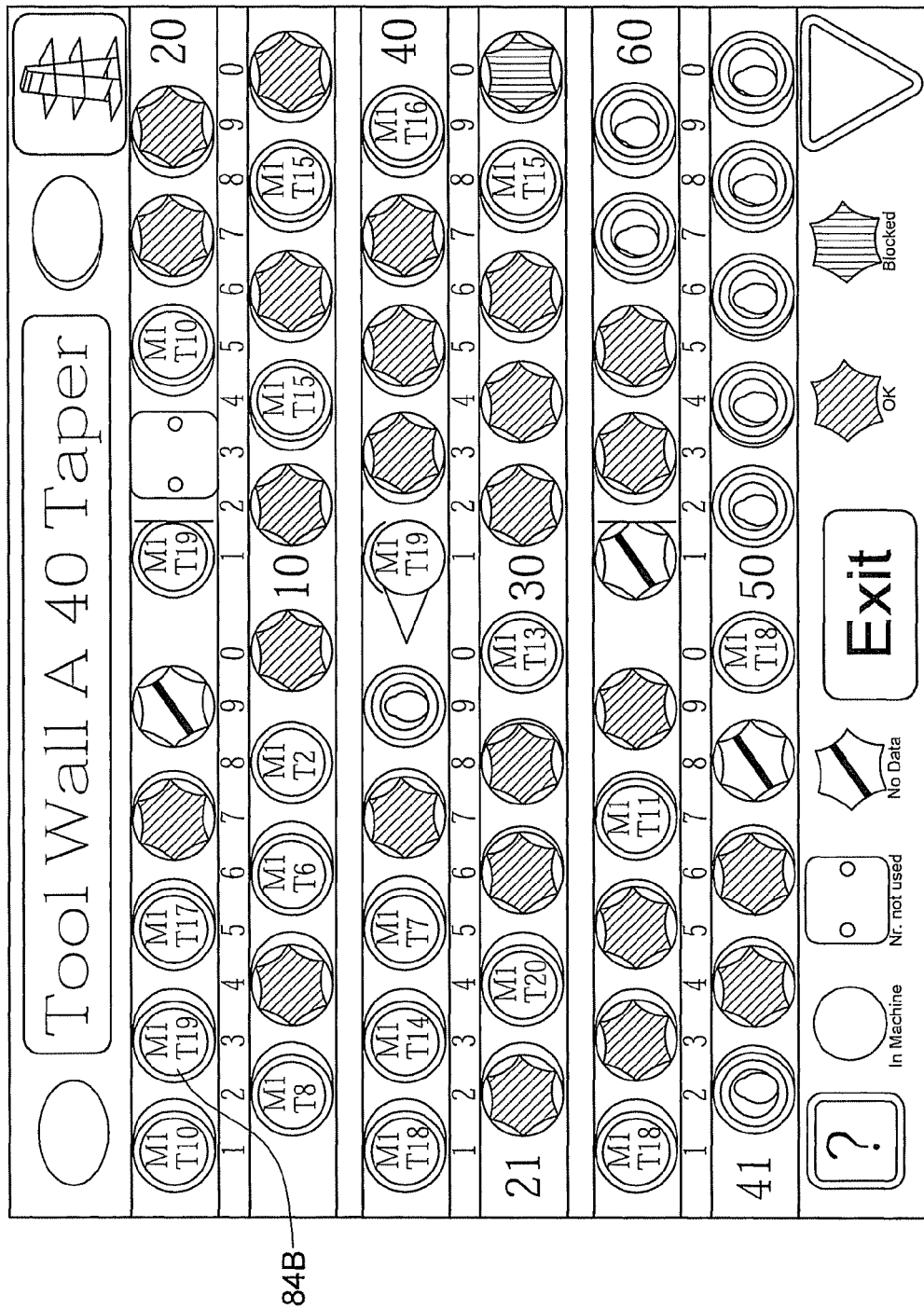
FIG. 7 is an example of a graphical user interface display.

FIG. 7 shows an example embodiment of a GUI display 80A. In GUI display 80A, controls 84 corresponding to receptacles for which the corresponding tool/tool holders are present in the receptacles are indicated by a first icon or other indicia; controls 84 corresponding to receptacles for which no tool/tool holder has been assigned are indicated by a second icon or other indicia and controls 84 corresponding to receptacles for which an assigned tool/tool holder is out are indicated by a third icon or other indicia. In the illustrated embodiment, where an assigned tool/tool holder is not present in tool storage system 72, the third icon indicates the machine in which the tool/tool holder is currently resident and the tool ID associated with that tool/tool holder in that machine 79. For example, control 84B indicates that the associated tool/tool holder is resident in machine 1 where the tool/tool holder is identified locally as tool #19.

In some embodiments, including the illustrated embodiment, additional icons or other indicia may be associated with some controls 84. In the illustrated embodiment, some tool holders are 'blocked'. Controls 84 for blocked tool holders are indicated by a fourth icon or other indicia. A tool holder may be marked as being blocked if that a tool holder is unavailable for use for some reason. For example, a user may set a tool holder to a blocked state in computer 73 if that tool holder is broken, unusable, out for repair or the like.

In the illustrated embodiment, computer system 73 has inadequate information for some tool holders. Certain information such as the length, diameter or the like of a tool held by a tool holder may be considered essential. Until all of the essential information has been provided to computer system 73 the compute system 73 may display an icon for the corresponding control 84 that indicates that no or incomplete information for the tool holder/tool is in computer system 73.

Computer 73 comprises an input device that a user may use to activate controls 84 and to otherwise control operations of computer 73. The input device may comprise a mouse, trackball, digital pen, touch pad, or the like. In preferred embodiments, display 74 comprises a touch screen. In such embodiments a user can activate a control 84 by touching a location on display 74 at which an icon representing a desired control 84 is being displayed.

A user may use computer 73 to obtain information about tools in tool storage system 72. For example, in an embodiment, the user finds the tool of interest in tool storage system 72 and locates the control 84 corresponding to the receptacle 75 in which the tool of interest is located. The user activates the control by touching display 74 at the location of the control 84. In response, computer may display information about the tool. The information may include some or all of the information described above, for example. In some embodiment, activating a control 84 causes computer 73 to display only selected parts of the information about the tool that is available in computer 73. In such embodiments, computer 73 may display a menu or the like that allows a user to select additional categories of information regarding the tool to be displayed.

In embodiments, computer 73 permits a user to search for tools having particular configuration. for example, computer 73 may permit a user to search for tools:
- that are associated with a particular job;
- that are of a particular type (e.g. search for tools wherein a tool holder holds a ½ inch carbide endmill; search for tools supplied by a certain supplier; search for tools made by a specified manufacturer etc.);

Computer 73 may respond by identifying the location in tool storage system 72 of any tools that match the search parameters. The identification may show the location of the tool(s) matching the search query on a graphical depiction of the tool storage system or by providing a list of location names or numbers.

Computer 73 may be interfaced to a tool presetter by way of a suitable data communication path. This can enable information about tool length and diameter for a particular tool, as measured by the presetter, to be directly loaded into computer 73. In some embodiments, this also permits a particular tool to be identified.

For example, a tool presetter 77 is shown in FIG. 5. Tool presetter 77 is connected to computer 73 by data path 78. Data path 78 may be wired or provided by any suitable form of wireless data communication. As an example of the use of presetter 77 a user may select a tool setup function. The tool setup function allows a user to enter tool dimensions and offsets into computer 73. As an alternative to entering manually dimensions measured by presetter 77 a user may cause computer 73 to input values from presetter 77 by way of data path 78.

Each tool holder/tool combination may be labelled with indicia identifying the receptacle 75 of tool storage system 72 with which the tool/tool holder is associated. The indicia may, for example, be marked on labels attached to the tool holders, marked directly on the tool holders, engraved or etched into the tool holders, or the like.

Computer 73 may provide a tool-identification function. In a case where a label affixed to a tool holder has come off or become unreadable the tool identification function may be used to identify the tool based on information about the tool. For example, the offset of the tool may be measured. The tool identification function may search data maintained by computer 73 to locate any records associated with tools having the measured offset. In some embodiments the offset may be measured by presetter 77 and the measured value may be transmitted directly to computer 73 and provided as a search term for the tool identification function.

Computer 73 may track the current locations of tools that are not in tool storage system 72. In some embodiments, computer 73 comprises a function for coordinating the transfer or one or more tools from tool storage system 72 to a machine and/or coordinating the transfer of one or more tools from a machine back to assigned receptacles of tool storage system 72. In some embodiments the tool transfer function records the particular tool pocket in a machine (e.g. a local ID in the machine) to which a tool has been transferred. In such embodiments, computer 73 may maintain for each machine what tool is in each tool pocket of the machine (and which tool pockets are empty) as well as records of which tools are assigned to each receptacle 75 of tool storage system 72, which receptacles 75 do not have an assigned tool, and which tools that are assigned to a receptacle 75 are (or should be) present in the assigned receptacle 75.

In some embodiments, computer 73 applies tool placement rules to determine in which pocket in a machine certain tools ought to be loaded. For example:
- In some machines, certain pockets may not be working properly. The rule may prevent any tools from being assigned to such pockets;
- Some tools (e.g. large face mills) may require that no other tools be in adjacent pockets. The rule may ensure that no other tools are assigned to pockets adjacent to such large tools;
- etc.

In some embodiments, computer 73 is in data communication with a controller of a CNC machine 79. For example, FIG. 5 shows computer 73 connected to two CNC machines 79A and 79B respectively. In such embodiments, tool offset information and/or tool dimension information for tools that have been transferred to a CNC machine 79 may be uploaded directly from computer 73 to the CNC machine 79. This may be done automatically or, in the alternative, in response to user input.

In some embodiments, additional information about tools present in a CNC machine is uploaded from computer system 73 to CNC machine 79. The additional information may comprise, for example, speeds or feeds or other operating parameters for the tools. The additional information may be stored as parameters in a controller of the CNC machine 79 so that the additional information is available to programs that are run on the controller of the CNC machine 79.

In some embodiments, computer 73 maintains information relating to machining jobs to be performed by CNC machines 79. The information may include, for example, lists of tools required for specific jobs and/or CNC programs to be run on CNC machines 79 in order to perform machining as required by the specific jobs. In some such embodiments, computer 73 executes a function that causes it to compare a list tools required for a job to the tools recorded as being present on a machine 79 which will be used in the job. Computer 73 then prompts a user to transfer any required tools not present in the machine 79 from tool storage system 72 to the machine 79. Computer 73 may specify which open tool pockets of the machine 79 the tools will be inserted into or, in the alternative, may allow a user to select an arrangement for the tools in the tool pockets and input into computer 73 which tool is in which pocket of the machine 79.

A CNC machine typically has a tool changer. The controller of the machine can cause the tool changer to transfer a tool that is currently in a spindle of the machine or otherwise ready for use into a pocket and to load a new tool from another pocket. Tool changes are typically specified by a program that controls the machine. The program typically requests tools by an ID (pocket) for the tool. In cases where a tool is always returned to the same location in a magazine then the ID may be an ID associated with that magazine location. Some CNC machines have 'random' tool storage. In such machines a tool may not be returned to an original magazine location when it is changed out. In such machines the machine controller assigns an ID to each tool and keeps track of the magazine locations in which different tools are stored. In such machines the program can request tools by tool ID.

In some embodiments, computer 73 has a function for uploading programs to CNC machines 79. In some such embodiments, the programs stored in computer 73 reference different tools that they require using placeholder information that identifies directly or indirectly the receptacles in tool storage system 72 corresponding to the required tools. In such embodiments, before uploading a program to a CNC machine 79 computer 73 identifies the local ID (e.g. pocket) in which each of the required tools is stored on the CNC machine 79. Computer 73 then modifies the program by substituting for the placeholder information in the program the corresponding local ID in the CNC machine 79 for each tool to be used by the program. Computer 73 can then upload the modified program to the CNC machine 79. This may be done automatically or with user input or assistance.

In some embodiments, a program stored in computer system 73 may have placeholders for or references to information other than tool locations. An example of such other information is speeds or feeds for certain tools. In some such embodiments, computer system 73 modifies the program with information for the selected tools. This information may be retrieved from a data store accessible to computer system 73. The program modifications could be performed, for example, by replacing the placeholders with corresponding information for the selected tools or by supplying information to be stored at locations identified by the references.

As an example application consider the case where a tool holder initially holds a ½-inch diameter end mill of a type for which the recommended speed in a material for the job is 2000 RPM. In this case, when the program, as modified by computer 73 is run on the CNC machine 79 the program will cause the CNC machine 79 to operate the tool at 2000 RPM. If the tool is replaced with a high-performance endmill that can be operated at a speed of 10,000 RPM in the material for the job and the data in computer 73 is updated to specify 10,000 RPM as the speed for the tool then the next time the program is uploaded to the CNC machine 79 computer system 73 will modify the program such that the CNC machine 79 will operate the tool at 10,000 RPM. This can be achieved without requiring any human operator to manually edit the program at the CNC machine or elsewhere.

In some embodiments, the programs uploaded by computer 73 include G-code, which may be based upon the RS-274D standard originally developed by the Electronic Industry Association. In such programs, tools may be selected by a T-word. For example, in such programs T10 would cause the tool changer of a CNC machine 79 to select the tool having ID "10".

Computer 73 may provide additional useful functions. For example, computer 73 may monitor the amount of time taken by various jobs, the jobs run by different machine shop personnel, the cost of tooling expended on a job, etc.

In an example embodiment, a user wishes to run a job on a particular CNC machine 79. The user selects the job on an interface provided by computer 73. This may be done by touching a touch-sensitive display 74. Computer 73 determines what tools are required for the job and determines which, if any of those tools are already present in the selected CNC machine 79. Computer 73 generates a set of transfer instructions which, when performed by a machine operator will result in the selected machine 79 having the tools required for the selected job. The transfer instructions instruct the operator to transfer tools from tool storage system 72 to the selected machine 79 and/or from the machine 79 to tool storage system 72. An example of a transfer instruction is "Transfer the tool at location #45 on the tool storage system to pocket #7 on machine #1."

The machine operator confirms completion of each transfer instruction by, for example, touching a control on display 74. Computer 73 updates its internal records regarding the location of each tool. In this example, computer 73 then uploads offset information for each tool to the controller of the selected machine 79. Computer 73 also uploads a program for the selected job to the controller of machine 79. In uploading the program, computer 73 replaces placeholder references to tools with references to the local ID (e.g. pocket number) of each referenced tool in the selected machine 79. The operator can then run the job on the selected machine 79. Computer 73 tracks statistics regarding the job (for example, the time taken to run the job etc.).

In some workplaces there are CNC machines that accept different types of tool holders. For example, the workplace may have some CNC machines that accept one taper of tool holder and other machines that accept another taper (e.g. some machines may be 50-taper machines and other may be 30-taper machines). As another example, some machines may require one geometry of retention stud while other machines may require another geometry of retention stud. In these cases, tool holders are not interchangeable between machines of the different groups. In such cases, a separate tool storage system 72 or a separate section of a tool storage system 72 may be assigned to each group of machines. Computer 73 may be configured to separately perform the functions as described herein for each of two or more groups of non-compatible tool holders. This permits a single computer system 73 to be used to manage tools for multiple different groups of CNC machines.

Certain implementations of the invention comprise data processors which execute software instructions which cause the processors to perform a method of the invention. For example, one or more processors in a computer 73 may implement methods as described herein executing software instructions in a program memory accessible to the processors. Computer 73 need not be a general-purpose computer. The functions of computer 73 could be provided by a suitable embedded processor in a system customized to perform functions of the nature described herein. The invention may also be provided in the form of a program product. The program product may comprise any medium which carries a set of computer-readable instructions which, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable instructions on the program product may optionally be compressed or encrypted.

Where a component (e.g. a panel, frame, receptacle, slot, member, device, display, computer, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure but which perform the function in the illustrated exemplary embodiments of the invention.

As will be apparent to those skilled in the art in the light of the foregoing disclosure, many alterations and modifications are possible in the practice of this invention without departing from the spirit or scope thereof. For example:

Receptacles 18 may be made (for example, by any suitable process such as injection molding or the like).
Receptacles may be fabricated in sections such that a plurality of receptacles 18 are provided together in one unit.
Receptacles 18 and panels 14 may be fabricated as one unit.
It is not mandatory that a system according to the invention be self-supporting. A system according to the invention may be made to attach to an existing wall.

It is beneficial that resilient ring 28 extend around the opening of socket portion 24 as resilient ring 28 can then protect the tapered part 31 of tool holder 30. In some alternative embodiments, resilient ring 28 is not present and a resilient pad is provided to support tapered part 31 from below. In other alternative embodiments, tapered part 31 bears directly against the material of receptacle 18 which may optionally include a formed feature to support tapered part 31 from below.

In embodiments of one aspect of the invention receptacles 18 that are oriented generally horizontally are disposed in an array that is generally vertical. Receptacles 18 may be supported in such an array by constructions that depart from that depicted in the appended drawings.

The mechanism for retaining a tool holder 30 in a receptacle 18 may be varied. For example: instead of a slot 42, a horizontal edge that fits between the head 32A of a retention stud and tapered part 31 of a tool holder may be provided; slot 42 is not necessarily oriented vertically but may extend upwardly and to one side.

Features of the various embodiments described herein and modifications to such features may be combined with one another in various permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A tool storage system for storing tool holders for use in machine tools, which tool holders are of the type including a taper shank for clamping in the machine tools, and including a retention stud projecting from the taper shank by a neck portion of the retention stud to a head of the retention stud, the neck portion having a smaller diameter than the head of the retention stud, the system comprising
a plurality of generally-horizontal receptacles configured to receive the tool holders with longitudinal axes thereof extending generally horizontally, the generally-horizontal receptacles arranged in a generally vertical array, each of the receptacles adapted to receive and retain a respective tool holder, each of the receptacles comprising a retention portion having an opening with an opening portion that is large enough to pass the head of the respective retention stud, which opening portion is located below and contiguous with a slot that is too narrow to pass the head of the respective retention stud but is wide enough to receive the neck portion of the respective retention stud to thus retain the respective tool holder.

2. A system according to claim 1 wherein centerlines of the receptacles are within ±15 degrees of horizontal.

3. A system according to claim 1 wherein the receptacles are dimensioned to receive and retain CAT 40 tool holders.

4. A system according to claim 1 wherein the receptacles are dimensioned to receive and retain 30-, 40-, 45-, 50- or 60-taper V-flange tool shanks.

5. A system according to claim 1 wherein the receptacles are each configured to support a respective one of the tool holders from below on one side of the taper shank of the respective tool holder.

6. A system according to claim 1 wherein the receptacles each comprise a fulcrum located horizontally between a center of gravity of the respective tool holder and the retention stud of the respective tool holder.

7. Apparatus according to claim 6 wherein the fulcrum comprises a resilient ring extending around a bore of the receptacle.

8. A system according to claim 1 wherein a respective one of the tool holders is inserted into a respective one of the receptacles by pushing the respective tool holder into the respective receptacle until the head has passed through the opening portion, and then pivoting the respective tool holder until the neck is received in the slot.

9. A system according to claim 1 comprising a panel wherein a plurality of the receptacles are mounted to the panel in an array.

10. A system according to claim 9 wherein the panel is within ±15 degrees of vertical.

11. A system according to claim 10 wherein the panel is one of a plurality of panels and each one of the panels carries an array of the receptacles.

12. A system according to claim 1 wherein the receptacles each comprise a body attached to a plate, the respective body having a bore dimensioned to receive the taper shank of a respective tool holder, the plate having the retention portion in line with the bore.

13. Apparatus including the system according to claim 1, wherein the receptacles are arranged in a pattern, the apparatus further comprising a computer system comprising a display, wherein the computer system presents a graphical user interface having controls corresponding to the receptacles and arranged in the pattern on the display.

14. Apparatus according to claim 13 wherein the computer system is configured to track locations of tool holders associated with the receptacles and the controls are represented by indicia on the display wherein controls corresponding to receptacles for which the corresponding tool holder is present in the respective receptacle are indicated by a first indicia; controls corresponding to receptacles for which no tool or tool holder has been assigned are indicated by a second indicia; and controls corresponding to receptacles for which an assigned tool or tool holder is out are indicated by a third indicia.

15. Apparatus according to claim 14 wherein the third indicia includes indicia indicating a machine at which the tool holder is located and a local identification (ID) for the indicated tool holder on the indicated machine.

16. Apparatus according to claim 13 wherein the computer system is configured to provide information regarding a tool associated with a respective receptacle upon activation of the control corresponding to the respective receptacle.

17. Apparatus including the system according to claim 1, further comprising a computer system comprising a display, wherein the computer system is configured to allow a user to identify a job to be executed on a Computer Numerical Control (CNC) machine and to upload to the CNC machine over a data communication path a program corresponding to the job.

18. Apparatus according to claim 17 wherein the computer system is configured to track local identifications (IDs), local to the CNC machine, of tool holders associated with the receptacles and to replace placeholders in the program with corresponding local IDs.

19. Apparatus according to claim 17 wherein the computer system is configured to track identifications (IDs) local to the CNC machine of tool holders associated with the receptacles and to upload to the CNC machine offset information for tool holders having IDs local to the CNC machine.

20. Apparatus according to claim 17 wherein the computer system is configured to track identifications (IDs local to the CNC machine of tool holders associated with the receptacles and to upload to the CNC machine one or more tool operating parameters associated with tool holders having IDs local to the CNC machine.

21. Apparatus according to claim 17 wherein the computer system maintains a list of tools associated with jobs, and is configured to: track identifications (IDs) local to the CNC machine of tool holders associated with the receptacles; determine a set of one or more tools required for a selected job and not present on the CNC machine; and, generate transfer instructions instructing an operator to transfer tools from the tool storage system to the CNC machine.

22. Apparatus according to claim 17 wherein the computer system is configured to track local identifications (IDs local to the CNC machine of tool holders associated with the receptacles and to modify the program to apply one or more operating parameters associated with the tool holders.

* * * * *